United States Patent
Hamerton et al.

(10) Patent No.: US 12,098,246 B2
(45) Date of Patent: Sep. 24, 2024

(54) TERNARY RESIN BLENDS

(71) Applicant: Rolls-Royce plc, London (GB)

(72) Inventors: Ian Hamerton, Derby (GB); Aristeidis Tsiamis, Derby (GB)

(73) Assignee: ROLLS-ROYCE PLC, London (GB)

( * ) Notice: Subject to any disclaimer, the term of this patent is extended or adjusted under 35 U.S.C. 154(b) by 560 days.

(21) Appl. No.: 17/221,382

(22) Filed: Apr. 2, 2021

(65) Prior Publication Data

US 2021/0340324 A1    Nov. 4, 2021

(30) Foreign Application Priority Data

Apr. 29, 2020 (GB) ...................... 2006287

(51) Int. Cl.
    *C08G 73/06*     (2006.01)
    *C08K 3/04*     (2006.01)
    *C08L 61/14*     (2006.01)
    *C08L 79/04*     (2006.01)

(52) U.S. Cl.
CPC ............ *C08G 73/065* (2013.01); *C08K 3/042* (2017.05); *C08L 61/14* (2013.01); *C08L 79/04* (2013.01); *C08K 2201/011* (2013.01)

(58) Field of Classification Search
CPC ................ C08G 73/065; C08K 3/042; C08K 2201/011; C08K 5/136; C08L 61/14; C08L 79/04; C08L 63/04
See application file for complete search history.

(56) References Cited

U.S. PATENT DOCUMENTS

| | | |
|---|---|---|
| 10,028,377 B2 | 7/2018 | Oka et al. |
| 2010/0212830 A1 | 8/2010 | Stumbeck et al. |
| | (Continued) | |

FOREIGN PATENT DOCUMENTS

| | | | |
|---|---|---|---|
| CN | 102676112 A | * | 9/2012 |
| JP | H08176299 A | | 7/1996 |
| | (Continued) | | |

OTHER PUBLICATIONS

Vryonis et al. Structural and chemical comparison between moderately oxygenated and edge oxygenated graphene: mechanical, electrical and thermal performance of the epoxy nanocomposites, SN Applied Sciences (2019) 1:1275 (Year: 2019).*

(Continued)

*Primary Examiner* — Heidi R Kelley
*Assistant Examiner* — Surbhi M Du
(74) *Attorney, Agent, or Firm* — Oliff PLC (57) ABSTRACT

Ternary resin blends which can be cured in order to form a cured resinous material for use as a matrix in composite materials. The ternary resin blends comprise a polyfunctional cyanate ester, an asymmetric bisphenol-derived cyanate ester, and a compound of formula (I) wherein $R_1$, $R_2$, $R_3$, $R_4$, $R_5$ and $R_6$ are as defined in the specification. A cured resinous material prepared by curing a ternary resin blend, a composite material comprising said cured resinous material, an article comprising said cured resinous material or said composite material, and methods for making the ternary resin blends, cured resinous materials, composite materials and articles are also disclosed.

12 Claims, 2 Drawing Sheets

(56) References Cited

U.S. PATENT DOCUMENTS

2015/0376149 A1  12/2015  Adam
2017/0287589 A1* 10/2017  Chang .................. H05K 1/0353

FOREIGN PATENT DOCUMENTS

JP         H08283409 A    10/1996
WO         2000/55123 A1   9/2000

OTHER PUBLICATIONS

Ragu, The role of a gas turbine engine in aircraft | Digitash, Posted on May 20, 2019 (Year: 2019).*
Guenthner et al. Synergistic Physical Properties of Cocured Networks Formed from Di- and Tricyanate Esters, ACS Appl. Mater. Interfaces May 2013, 8772-8783 (Year: 2013).*
Crawford et al. Improving the hydrolytic stability of aryl cyanate esters by examining the effects of extreme environments on polycyanurate copolymers, Reactive and Functional Polymers 109 (2016) pp. 104-111 (Year: 2016).*
Sep. 24, 2021 Extended Search Report issued in European Patent Application No. 21165443.9.

* cited by examiner

FIG. 1

Mixing a polyfunctional cyanate ester, an asymmetric bisphenol-derived cyanate ester, and a compound of formula (I)

FIG. 2

Curing a composition comprising a polyfunctional cyanate ester, an asymmetric bisphenol-derived cyanate ester, and a compound of formula (I)

FIG. 3

Combining a composition comprising a polyfunctional cyanate ester, an asymmetric bisphenol-derived cyanate ester, and a compound of formula (I) with a reinforcing material Curing the composition comprising a polyfunctional cyanate ester, an asymmetric bisphenol-derived cyanate ester, a compound of formula (I) and a reinforcing material

FIG. 4

TERNARY RESIN BLENDS

CROSS-REFERENCE TO RELATED APPLICATIONS

This application claims priority pursuant to 35 U.S.C. 119(a) of United Kingdom Patent Application No. 2006287.3, filed Apr. 29, 2020, which application is incorporated herein by reference in its entirety.

BACKGROUND

Field of the Disclosure

The present disclosure concerns ternary resin blends (i.e. resin blends comprising at least three different components). The ternary resin blends can be cured in order to form a resinous material which can be used as a matrix in composite materials. The present disclosure further relates to a cured resinous material prepared by curing a ternary resin blend disclosed herein, a composite material comprising said cured resinous material, and an article comprising said cured resinous material or said composite material. The present disclosure additionally relates to methods for making the ternary resin blends, cured resinous materials, composite materials and articles disclosed herein.

Description of the Related Art

Composite materials comprising organic matrices are widely used for a variety of purposes. The chemical composition of the organic matrix may be selected depending on the desired properties of the composite material.

Cyanate esters are molecules in which the hydrogen atom of a phenolic OH group has been substituted with a cyanide (C≡N) group. Cyanate esters can be cured by heating, for example alone at elevated temperatures or at lower temperatures in the presence of a catalyst. The resulting cured resinous materials have relatively high glass-transition temperatures and low dielectric constants, thus providing good long-term thermal stability at elevated temperatures, good toughness, and good fire, smoke and toxicity performance. Blends of two or more cyanate esters, or blends of one or more cyanate ester(s) with one or more other components, can be formulated to fine-tune one or more properties of the material before and/or after curing. Such properties may include, for example, the processability/fluidity/viscosity prior to curing, thermo-mechanical properties (e.g. glass-transition temperature), thermal and thermo-oxidative stability, reactivity, flame retardancy, and moisture absorption.

It is therefore desirable to provide new resin blends, particularly new resin blends comprising one or more cyanate esters.

SUMMARY

According to a first aspect, there is provided a composition comprising:
a polyfunctional cyanate ester;
an asymmetric bisphenol-derived cyanate ester; and
a compound of formula (I):

wherein:
a. $R_1$ and $R_2$ are the same or different and are selected from hydrogen, halogen, and other electron withdrawing groups;
b. $R_3$, $R_4$, $R_5$ and $R_6$ are the same or different and are selected from hydrogen, halogen, and other groups that provide a thermally stable compound of formula (I); and at least one of $R_1$ and $R_2$ are halogen.

In certain embodiments, $R_1$ and $R_2$ are the same or different and are selected from hydrogen and halogen. Alternatively or additionally, in certain embodiments, $R_3$, $R_4$, $R_5$ and $R_6$ are the same or different and are selected from hydrogen, halogen and aromatic groups.

According to an alternative aspect, there is provided a composition comprising:
a polyfunctional cyanate ester;
an asymmetric bisphenol-derived cyanate ester; and
a compound of formula (I):

wherein:
a. $R_1$ and $R_2$ are the same or different and are selected from hydrogen, halogen, and other electron withdrawing groups;
b. $R_3$, $R_4$, $R_5$ and $R_6$ are the same or different and are selected from hydrogen, halogen, and aromatic groups; and
c. at least one of $R_1$ and $R_2$ are halogen.

In certain embodiments, $R_1$ and $R_2$ are the same or different and are selected from hydrogen and halogen. Alternatively or additionally, in certain embodiments, $R_3$, $R_4$, $R_5$ and $R_6$ are the same or different and are selected from hydrogen and halogen.

According to a second aspect, there is provided a cured resinous material obtained by or obtainable by curing a composition of the first aspect of the disclosure.

According to a third aspect, there is provided a composite material comprising a cured resinous material of the second aspect of the disclosure.

According to a fourth aspect, there is provided an article comprising a cured resinous material of the second aspect of the disclosure.

According to a fifth aspect, there is provided an article comprising a composite material of the third aspect of the disclosure.

According to a sixth aspect, there is provided a method of making a composition of the first aspect of the disclosure, the method comprising mixing a polyfunctional cyanate ester, an asymmetric bisphenol-derived cyanate ester, and a compound of formula (I).

According to a seventh aspect, there is provided a method of making a cured resinous material of the second aspect of the disclosure, the method comprising curing a composition of the first aspect of the disclosure.

According to an eighth aspect, there is provided a method of making a composite material of the third aspect of the disclosure, the method comprising combining a composition of the first aspect of the disclosure with a reinforcing material followed by curing the mixture.

The skilled person will appreciate that, except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

There is disclosed herein a ternary resin blend (i.e. a composition comprising at least three different components) which can be cured in order to form a resinous material which can be used as a matrix in composite materials.

The compositions disclosed herein comprise:
(a) a polyfunctional cyanate ester;
(b) an asymmetric bisphenol-derived cyanate ester; and
(c) a compound of formula (I):

wherein:
a. $R_1$ and $R_2$ are the same or different and are selected from hydrogen, halogen, and other electron withdrawing groups;
b. $R_3$, $R_4$, $R_5$ and $R_6$ are the same or different and are selected from hydrogen, halogen, and groups that provide a thermally stable compound of formula (I); or
c. $R_3$, $R_4$, $R_5$ and $R_6$ are the same or different and are selected from hydrogen, halogen, and aromatic groups; and
d. at least one of $R_1$ and $R_2$ are halogen.

In certain embodiments, $R_1$ and $R_2$ are the same or different and are selected from hydrogen and halogen and/or $R_3$, $R_4$, $R_5$ and $R_6$ are the same or different and are selected from hydrogen, halogen and aromatic groups.

In certain embodiments, $R_1$ and $R_2$ are the same or different and are selected from hydrogen and halogen and/or $R_3$, $R_4$, $R_5$ and $R_6$ are the same or different and are selected from hydrogen and halogen.

Compound of Formula (I)

As used herein, the term "electron withdrawing groups" refers to substituents which remove electron density from the conjugated a system. Examples of electron withdrawing groups include halogen, (e.g. fluorine, chlorine, bromine, iodine), nitroso (—N═O), aminocarbonyl groups (—CONR₂ wherein R is the same or different and selected from H or alkyl), carboxyl groups (—CO₂H), alkoxycarbonyl groups (—CO₂R wherein R is alkyl), acyl groups (—CHO), formyl groups (—COR wherein R is alkyl), haloformyl groups (—COX wherein X is halogen), trihalomethylgroups (—CX₃ wherein each X is the same or different and is a halogen), cyano group (—C≡N), sulfonic acid (—SO₃H), sulfonyl groups (—SO₂R wherein R is alkyl), nitro group (—NO₂), ammonium group (—NH₃), substituted ammonium group (—NR₃⁺ wherein R is alkyl), trihalomethylsulfonyl groups (—SO₂CX₃ wherein each X is the same or different and is a halogen, for example fluorine).

$R_1$ and $R_2$ may, for example, be the same or different and may be selected from hydrogen and halogen. $R_1$ and $R_2$ may, for example, be the same or different and may be halogen.

$R_1$ and/or $R_2$ may, for example, be halogen. $R_1$ and $R_2$ may, for example, be the same. $R_1$ and $R_2$ may, for example, be the same halogen.

Where one or both of $R_1$ and $R_2$ are halogen, the halogen may be selected from fluorine, chlorine, and bromine. For example, where one or both of $R_1$ and $R_2$ are halogen, the halogen may be selected from chlorine and bromine. For example, where one or both of $R_1$ and $R_2$ are halogen, the halogen may be chlorine. For example, $R_1$ and $R_2$ may be chlorine.

$R_3$ and $R_5$ may, for example, be the same. $R_4$ and $R_6$ may, for example, be the same. For example, $R_3$ and $R_5$ may be the same and $R_4$ and $R_6$ may be the same.

As used herein, the term "groups that provide a thermally stable compound of formula (I)" refers to substituents which result in a compound of formula (I) that loses equal to or less than about 1.0 wt % of its mass at 250° C. in air when measured by thermogravimetry ASTM E2550-17. This includes, for example, hydrogen, halogen and aromatic groups.

$R_3$, $R_4$, $R_5$ and $R_6$ may, for example, be the same or different and may be selected from hydrogen, halogen, and aromatic groups.

The term "aromatic groups" refers to substituents having a ring of resonance bonds and includes, for example, substituted and unsubstituted phenyl rings, substituted and unsubstituted heteroaromatic rings (e.g. substituted and unsubstituted pyridine, pyrazine, pyrrole, imidazole, pyrazole, oxazole or thiophene), and substituted and unsubstituted fused aromatic rings (e.g. substituted and unsubstituted naphthalene, anthracene or phenanthrene). For example, the aromatic group may be a substituted or unsubstituted phenyl ring. Suitable substituents for the aromatic groups include, for example, halogen, amine, carboxylic acid, nitro, hydroxyl, $C_1$-$C_4$ alkyl, and $C_1$-$C_6$ alkenyl, which may, for example, be conjugated to the aromatic ring.

Aromatic groups are relatively bulky and therefore may sterically inhibit the reaction of the OH groups on each phenol ring of the compound of formula (I) with other components in the tertiary blend. Therefore, a maximum of two of $R_3$, $R_4$, $R_5$ and $R_6$ may, for example, be aromatic groups. For example, one of $R_3$, $R_4$, $R_5$ and $R_6$ may be aromatic groups. Where two of $R_3$, $R_4$, $R_5$ and $R_6$ are aromatic groups, the aromatic groups may, for example, be present on the same phenol ring (i.e. both of $R_3$ and $R_4$ or both of $R_5$ and $R_6$ may be aromatic groups) or one aromatic group may be present on each phenol ring (i.e. one of $R_3$ and $R_4$ is an aromatic group and one of $R_5$ and $R_6$ is an aromatic group).

$R_3$, $R_4$, $R_5$ and $R_6$ may, for example, be the same or different and may be selected from hydrogen, halogen and aromatic groups.

$R_3$, $R_4$, $R_5$ and $R_6$ may, for example, be the same or different and may be selected from hydrogen and halogen.

At least one of $R_3$, $R_4$, $R_5$ and $R_6$ may, for example, be hydrogen. For example, at least two of $R_3$, $R_4$, $R_5$ and $R_6$ may be hydrogen. For example, at least three of $R_3$, $R_4$, $R_5$ and $R_6$ may be hydrogen. For example, all of $R_3$, $R_4$, $R_5$ and $R_6$ may be hydrogen.

At least one of $R_3$ and $R_4$ may, for example, be hydrogen. For example, both of $R_3$ and $R_4$ may be hydrogen. At least one of $R_5$ and $R_6$ may, for example, be hydrogen. For example, both of $R_5$ and $R_6$ may be hydrogen. At least one of $R_3$ and $R_4$ and at least one of $R_5$ and $R_6$ may, for example, be hydrogen. For example, all of $R_3$, $R_4$, $R_5$ and $R_6$ may be hydrogen.

At least one of $R_3$, $R_4$, $R_5$ and $R_6$ may, for example, be halogen. For example, at least two of $R_3$, $R_4$, $R_5$ and $R_6$ may be halogen. For example, at least three of $R_3$, $R_4$, $R_5$ and $R_6$ may be halogen. For example, all of $R_3$, $R_4$, $R_5$ and $R_6$ may be halogen.

At least one of $R_3$ and $R_4$ may, for example, be halogen. For example, both of $R_3$ and $R_4$ may be halogen. At least one of $R_5$ and $R_6$ may, for example, be halogen. For example, both of $R_5$ and $R_6$ may be halogen. At least one of $R_3$ and $R_4$ and at least one of $R_5$ and $R_6$ may, for example, be halogen. For example, all of $R_3$, $R_4$, $R_5$ and $R_6$ may be halogen.

Where one or more of $R_3$, $R_4$, $R_5$ and $R_6$ are halogen, the halogen may be selected from fluorine, chlorine, and bromine. For example, where one or more of $R_3$, $R_4$, $R_5$ and $R_6$ are halogen, the halogen may be selected from chlorine and bromine. For example, where one or more of $R_3$, $R_4$, $R_5$ and $R_6$ are halogen, the halogen may be chlorine.

$R_1$ and $R_2$ may, for example, be halogen and $R_3$, $R_4$, $R_5$ and $R_6$ may be hydrogen. For example, $R_1$ and $R_2$ may be selected from fluorine, chlorine, and bromine, and $R_3$, $R_4$, $R_5$ and $R_6$ may be hydrogen. For example, $R_1$ and $R_2$ may be selected from chlorine and bromine, and $R_3$, $R_4$, $R_5$ and $R_6$ may be hydrogen.

The compound of formula (I) may, for example, be bisphenol C (BPC) having the structure below:

Polyfunctional Cyanate Ester

As used herein, the term "cyanate ester" refers to a molecule in which the hydrogen atom of a phenolic OH group has been substituted with a cyanide (—C≡N) group. A "polyfunctional cyanate ester" is a cyanate ester which comprises more than one cyanide groups.

Any suitable polyfunctional cyanate ester may be used. For example, the polyfunctional cyanate ester may have a glass-transition temperature equal to or greater than about 300° C., when cured. For example, the polyfunctional cyanate ester may have a glass-transition temperature equal to or greater than about 310° C., for example equal to or greater than about 320° C., for example equal to or greater than about 330° C., for example equal to or greater than about 340° C., for example equal to or greater than about 350° C., for example equal to or greater than about 360° C., for example equal to or greater than about 370° C., for example equal to or greater than about 380° C., when cured. For example, the polyfunctional cyanate ester may have a glass-transition temperature equal to or less than about 500° C., for example equal to or less than about 490° C., for example equal to or less than about 480° C., for example equal to or less than about 470° C., for example equal to or less than about 460° C., for example equal to or less than about 450° C., for example equal to or less than about 440° C., for example equal to or less than about 430° C., for example equal to or less than about 420° C., for example equal to or less than about 410° C., for example equal to or less than about 400° C., when cured. For example, the polyfunctional cyanate ester may have a glass-transition temperature ranging from about 300° C. to about 500° C. or from about 350° C. to about 450° C. or from about 380° C. to about 420° C. or from about 380° C. to about 400° C., when cured. This refers to the glass-transition temperature of the polyfunctional cyanate ester when cured alone (i.e. without the other components in the ternary resin blend).

Glass-transition temperature may, for example, be measured by Dynamic Mechanical Analysis (DMA), for example according to ASTM D4065-12 or D5279-13.

The polyfunctional cyanate ester may, for example, be one of the polyfunctional cyanate esters disclosed in Chemistry and Technology of Cyanate Ester Resins (I Hamerton,

Ed.) Blackie Academic and Professional: Glasgow, 1994, pp. 34-43, the contents of which are incorporated herein by reference.

The polyfunctional cyanate ester may, for example, be a novolac cyanate ester.

Novolacs are polymers derived from phenol derivatives and formaldehyde such that the phenolic units are linked by methylene and/or ethylene groups in the ortho and/or para positions. The phenol derivative may, for example, be phenol or methylphenol. The ratio of formaldehyde to phenol derivative may, for example, be less than one. The novolac may, for example, comprise from about 10 to about 20 phenolic units.

Novolac cyanate esters are novolacs in which one or more hydrogen atom(s) of one or more phenolic OH group(s) are substituted with a cyanide (—C≡N) group. For example, the novolac cyanate ester may be a novalac in which the hydrogen atoms of two or more phenolic OH groups have been substituted with cyanide (—C≡N) groups. For example, the novolac cyanate ester may be a novolac in which all of the hydrogen atoms of the phenolic OH groups have been substituted with cyanide (—C≡N) groups.

The polyfunctional cyanate ester may, for example, be an oligomer of formula (II) below:

(II)

wherein n is 1, 2 or 3.

The polyfunctional cyanate ester of formula (II) may, for example, have a molecular weight ranging from about 300 g/mol to about 500 g/mol, for example from about 350 g/mol to about 450 g/mol, for example from about 360 to about 400 g/mol.

The polyfunctional cyanate ester may, for example, be the material referred to as Primaset® PT-30 supplied by Lonza Group Ltd or the material referred to as AroCy® XU-371 novalac-based cyanate ester supplied by Huntsman Advanced Materials.

Asymmetric Bisphenol-Derived Cyanate Ester

As used herein, the term "cyanate ester" refers to a molecule in which the hydrogen atom of a phenolic OH group has been substituted with a cyanide (—C≡N) group.

As used herein, the term "bisphenol" refers to molecules with two hydroxyphenyl groups. The bisphenol may, for example, be diphenylmethane with one hydroxyl group on each phenyl ring.

A "bisphenol-derived cyanate ester" is a bisphenol in which the hydrogen atom of each hydroxyl group on the phenyl rings has been substituted with a cyanide (—C≡N) group. An "asymmetric bisphenol-derived cyanate ester" is a bisphenol-derived cyanate ester that does not have any reflectional symmetry.

Any suitable asymmetric bisphenol-derived cyanate ester may be used. For example, the asymmetric bisphenol-derived cyanate ester may be an asymmetric bisphenol-derived cyanate ester having a bridging unit that disrupts the crystallinity of the monomer rendering it either a liquid or a solid having a melting point below 100° C.

The asymmetric bisphenol-derived cyanate ester may, for example, be one of the asymmetric bisphenol-derived cyanate esters disclosed in Chemistry and Technology of Cyanate Ester Resins (I Hamerton, Ed.) Blackie Academic and Professional: Glasgow, 1994, pp. 34-44, the contents of which are incorporated herein by reference. For example, the asymmetric bisphenol-derived cyanate ester may be selected from bisphenol E dicyanate, p-cumylphenylcyanate (see Table 2.7 of "Chemistry and Technology of Cyanate Ester Resins cited above), the siloxane in Table 2.9 of "Chemistry and Technology of Cyanate Ester Resins cited above, diallylbisphenol A dicyanate and its dipropenyl analogue (see Table 2.9 of "Chemistry and Technology of Cyanate Ester Resins cited above), the fluoropolymers in Table 2.13 of "Chemistry and Technology of Cyanate Ester Resins cited above) and the monofunctional cyanates in Table 2.15 of "Chemistry and Technology of Cyanate Ester Resins cited above).

The asymmetric bisphenol-derived cyanate ester may, for example, be suitable for use as a reactive diluent to enhance the low temperature processability of the polyfunctional cyanate esters described herein.

The asymmetric bisphenol-derived cyanate ester may, for example, be a compound of formula (III) below:

(III)

wherein $R^9$ and $R^{10}$ are independently selected from hydrogen and $C_{1-4}$ alkyl, and $R^9$ and $R^{10}$ are different.

The asymmetric bisphenol-derived cyanate ester may, for example, be a compound of formula (IIIa) below:

(IIIa)

wherein $R^9$ and $R^{10}$ are independently selected from hydrogen and $C_{1-4}$ alkyl, and $R^9$ and $R^{10}$ are different.

For example, one of $R^9$ and $R^{10}$ may be hydrogen and the other of $R^9$ and $R^{10}$ may be $C_{1-4}$ alkyl (i.e. alkyl having between 1 and 4 carbon atoms). For example, one of $R^9$ and $R^{10}$ may be hydrogen and the other of $R^9$ and $R^{10}$ may be methyl or ethyl. For example, one of $R^9$ and $R^{10}$ may be hydrogen and the other of $R^9$ and $R^{10}$ may be methyl.

For example, the asymmetric bisphenol-derived cyanate ester may be bisphenol E dicyanate having the structure below:

The asymmetric bisphenol-derived cyanate ester may, for example, be the material referred to as Primaset® LECy supplied by Lonza Group Limited, or the material referred to as AroCy® L-10 low viscosity bisphenol-E based cyanate ester supplied by Huntsman Advanced Materials.

Reinforcing Material

The composition of the first aspect of the disclosure, the cured resinous material of the second aspect of the disclosure, the composite material of the third aspect of the disclosure, and the articles of the fourth and fifth aspects of the disclosure may further comprise a reinforcing material.

As used herein, a "reinforcing material" is any material that increases any mechanical property of the composition of the first aspect after it has been cured.

For example, the composition of the first aspect of the disclosure, the cured resinous material of the second aspect of the disclosure, the composite material of the third aspect of the disclosure, and the articles of the fourth and fifth aspects of the disclosure may further comprise a nanomaterial.

As used herein, a "nanomaterial" is any material having one or more average dimensions in the range of 1 nm to 100 nm.

The nanomaterial may, for example, be selected from nanoparticles (e.g. alumina, silica, titania, boron nitride, aluminium nitride), metallic nanowhiskers, graphene (e.g. sheets, tubes, spheres), graphite, functionalised graphene (e.g. sheets, tubes, spheres), silicon nanotubes, and suitably functionalised polyhedral oligomeric silsequioxane (POSS) cages so as to render them co-reactive with the cyanate ester. The functionalised graphene may, for example, be functionalised with oxygen or carboxyl. The nanomaterial may, for example, be edge-oxidised graphene oxide.

The nanomaterial may, for example, be present in the composition of the first aspect in an amount equal to or less than about 5.0 wt %, based on the total dry weight of the composition. For example, the nanomaterial may be present in the composition in an amount equal to or less than about 4.5 wt %, for example equal to or less than about 4.0 wt %, for example equal to or less than about 3.5 wt %, for example equal to or less than about 3.0 wt %, for example equal to or less than about 2.5 wt %, for example equal to or less than about 2.0 wt %, for example equal to or less than about 1.5 wt %, for example equal to or less than about 1.0 wt %, for example equal to or less than about 0.5 wt %, based on the total dry weight of the composition.

The nanomaterial may, for example, be present in the composition of the first aspect in an amount equal to or greater than about 0.01 wt %, based on the total dry weight of the composition. For example, the nanomaterial may be present in the composition in an amount equal to or greater than about 0.05 wt %, for example equal to or greater than about 0.1 wt %, based on the total dry weight of the composition.

For example, the nanomaterial may be present in the composition of the first aspect in an amount ranging from about 0.01 wt % to about 5.0 wt %, for example from about 0.05 wt % to about 2.0 wt %, for example from about 0.1 wt % to about 1.0 wt %, based on the total dry weight of the composition.

Ternary Resin Blend

The composition according to the first aspect disclosed herein may, for example, comprise a compound of formula (I), a compound of formula (II), and a compound of formula (III). For example, the composition according to the first aspect disclosed herein may, for example, comprise bisphenol C (BPC), a compound of formula (II), and a compound of formula (III). The composition according to the first aspect disclosed herein may, for example, comprise a compound of formula (I), a compound of formula (II), and bisphenol E dicyanate.

The polyfunctional cyanate ester, the asymmetrical bisphenol-derived cyanate ester and the compound of formula (I) may be present in the composition of the first aspect of the disclosure in any amount, provided that the total does not exceed 100 wt %, based on total dry weight of the composition.

The compound of formula (I) may, for example, be present in the composition according to the first aspect disclosed herein in an amount equal to or less than about 10.0 wt % based on the total dry weight of the composition. The total dry weight of the composition refers to the weight of the composition after any water or other solvent has been removed. For example, the compound of formula (I) may be present in the composition according to the first aspect in an amount equal to or less than about 9.0 wt % or equal to or less than about 8.0 wt % or equal to or less than about 7.0 wt % or equal to or less than about 6.0 wt % or equal to or less than about 5.0 wt % based on the total dry weight of the composition.

The compound of formula (I) may, for example, be present in the composition according to the first aspect disclosed herein in an amount equal to or greater than about 1.0 wt % based on the total dry weight of the composition. For example, the compound of formula (I) may be present in the composition according to the first aspect in an amount equal to or greater than about 1.5 wt % or equal to or less than about 2.0 wt % or equal to or less than about 2.5 wt % or equal to or less than about 3.0 wt % or equal to or less than about 3.5 wt % or equal to or greater than about 4.0 wt % based on the total dry weight of the composition.

For example, the compound of formula (I) may, for example, be present in the composition according to the first aspect disclosed herein in an amount ranging from about 1.0 wt % to about 10.0 wt %, for example from about 1.5 wt % to about 7.0 wt %, for example from about 3.0 wt % to about 5.0 wt %, based on the total dry weight of the composition.

The polyfunctional cyanate ester may, for example, be present in the composition according to the first aspect disclosed herein in an amount equal to or less than about 95.0 wt %, based on the total dry weight of the composition. For example, the polyfunctional cyanate ester may be present in the composition according to the first aspect in an amount equal to or less than about 94.0 wt % or equal to or less than about 93.0 wt % or equal to or less than about 92.0 wt % or equal to or less than about 91.0 wt % or equal to or less than about 90.0 wt % or equal to or less than about 89.0 wt % or equal to or less than about 88.0 wt % or equal to or less than about 87.0 wt % or equal to or less than about 86.0 wt % or equal to or less than about 85.0 wt %, based on the total dry weight of the composition.

The polyfunctional cyanate ester may, for example, be present in the composition according to the first aspect disclosed herein in an amount equal to or greater than about 75.0 wt %, based on the total dry weight of the composition. For example, the polyfunctional cyanate ester may be present in the composition according to the first aspect in an amount equal to or greater than about 76.0 wt % or equal to or greater than about 77.0 wt % or equal to or greater than about 78.0 wt % or equal to or greater than about 79.0 wt % or equal to or greater than about 80.0 wt % or equal to or greater than about 81.0 wt % or equal to or greater than about 82.0 wt % or equal to or greater than about 83.0 wt % or equal to or greater than about 84.0 wt %, based on the total dry weight of the composition.

For example, the polyfunctional cyanate ester may be present in the composition according to the first aspect of the disclosed in an amount ranging from about 75.0 wt % to about 95.0 wt %, for example from about 80.0 wt % to about 90.0 wt %, for example from about 83.0 wt % to about 88.0 wt %, based on the total dry weight of the composition.

The asymmetric bisphenol-derived cyanate ester may, for example, be present in the composition of the first aspect disclosed herein in an amount equal to or less than about 15.0 wt %, based on the total dry weight of the composition. For example, the asymmetric bisphenol-derived cyanate ester may be present in the composition of the first aspect in an amount equal to or less than about 14.0 wt % or equal to or less than about 13.0 wt % or equal to or less than about 12.0 wt % or equal to or less than about 11.0 wt %, based on the total dry weight of the composition.

The asymmetric bisphenol-derived cyanate ester may, for example, be present in the composition of the first aspect disclosed herein in an amount equal to or greater than about 5.0 wt %, based on the total dry weight of the composition. For example, the asymmetric bisphenol-derived cyanate ester may be present in the composition of the first aspect in an amount equal to or greater than about 6.0 wt % or equal to or greater than about 7.0 wt % or equal to or greater than about 8.0 wt % or equal to or greater than about 9.0 wt %, based on the total dry weight of the composition.

For example, the asymmetric bisphenol-derived cyanate ester may be present in the composition of the first aspect in an amount ranging from about 5.0 wt % to about 15.0 wt % or from about 8.0 wt % to about 12.0 wt %, based on the total dry weight of the composition.

The composition of the first aspect of the disclosure may, for example, have a bulk viscosity equal to or less than about 500 cP at 20° C. For example, the composition of the first aspect of the disclosure may have a bulk viscosity equal to or less than about 450 cP or equal to or less than about 400 cP at 20° C. The composition of the first aspect of the disclosure may, for example, have a bulk viscosity equal to or greater than about 200 cP at 20° C. For example, the composition of the first aspect of the disclosure may have a bulk viscosity equal to or greater than about 250 cP or equal to or greater than about 300 cP at 20° C. For example, the composition of the first aspect of the disclosure may have a bulk viscosity ranging from about 200 cP to about 500 cP or from about 250 cP to about 450 cP or from about 300 cP to about 400 cP at 20° C. Bulk viscosity may be measured by ASTM D4440-15.

The composition of the first aspect of the disclosure may, for example, have a dynamic rheology equal to or less than about 500 Pa·s at 30° C. For example, the composition of the first aspect of the disclosure may have a dynamic rheology equal to or less than about 450 Pa·s or equal to or less than about 400 Pa·s or equal to or less than about 350 Pa·s or equal to or less than about 300 Pa·s at 30° C. The composition of the first aspect of the disclosure may, for example, have a dynamic rheology equal to or greater than about 10 Pa·s. For example, the composition of the first aspect of the disclosure may have a dynamic rheology equal to or greater than about 20 Pa·s or equal to or greater than about 50 Pa·s or equal to or greater than about 100 Pa·s or equal to or greater than about 150 Pa·s at 30° C. Dynamic rheology may be measured by ASTM D4440-15.

There is also disclosed herein a method for making a composition according to the first aspect of the disclosure, the method comprising mixing a polyfunctional cyanate ester, an asymmetric bisphenol-derived cyanate ester, and a compound of formula (I). The components may be mixed in any suitable order. Any suitable mixing technique and/or equipment can be used. One or more of the components of the composition of the first aspect of the disclosure may be heated prior to weighing and/or prior to mixing with the other components to improve its viscosity and processability. For example, the polyfunctional cyanate ester and/or the asymmetric bisphenol-derived cyanate ester may be heated, for example to a temperature ranging from about 60° C. to about 120° C., for example from about 80° C. to about 100° C., for example about 90° C., prior to weighing and/or mixing with the other components.

Cured Resinous Material

There is also disclosed herein a cured resinous material obtained by and/or obtainable by curing a composition according to the first aspect of the disclosure. There is further disclosed herein a method of making said cured resinous material, the method comprising curing a composition according to the first aspect of the disclosure.

Without wishing to be bound by theory, it is thought that curing compositions comprising polyfunctional cyanate esters leads to crosslinking between the cyanate groups to form a network of oxygen-linked triazine rings (cyanurates) and bisphenol ethers. This structure is a result of cyclotrimerization of the —O—C≡N groups. The presence of reactive groups on other components of the composition of the first aspect of the disclosure may result in these components also becoming incorporated into the crosslinked structure of the cured resinous material. For example, the —O—C≡N groups of the asymmetric bisphenol-derived cyanate ester may crosslink with —O—C≡N groups in the polyfunctional cyanate ester and/or the asymmetric bisphenol-derived cyanate ester, for example to form oxygen-linked triazine rings. For example, the double bond and/or the —OH groups of the compound of formula (I) may crosslink with —O—C≡N groups in the polyfunctional cyanate ester and/or the asymmetric bisphenol-derived cyanate ester. This may, for example, reduce the amount of hydrolysable residual cyanate ester and hydroxyl groups present in the cured resinous material.

The curing of the composition of the first aspect of the disclosure may, for example, result in a degree of curing equal to or greater than about 85.0%. For example, the curing may result in a degree of curing equal to or greater than about 86.0%, for example equal to or greater than about 87.0%, for example equal to or greater than about 88.0%, for example equal to or greater than about 89.0%, for example equal to or greater than about 90.0%, for example equal to or greater than about 91.0%, for example equal to or greater than about 92.0%.

The curing of the composition of the first aspect of the disclosure may, for example, result in a degree of curing equal to or less than about 98.0%. For example, the curing may result in a degree of curing equal to or less than about 97.0%, for example equal to or less than about 96.0%, for example equal to or less than about 95.0%, for example equal to or less than about 94.0%.

For example, the curing of the composition of the first aspect of the disclosure may result in a degree of curing ranging from about 85.0% to about 98.0% or from about 88.0% to about 95.0% or from about 90.0% to about 94.0%.

Degree of curing may be measured by differential scanning calorimetry (DSC), running a dynamic scan from room temperature to 400° C. at a heating rate of 10K/min. Degree of curing is calculated using the following formula in which ΔH$_c$ is the curing exotherm enthalpy (J/g) and ΔH$_{pc}$ is the post-curing exotherm enthalpy (J/g).

$$\left(1 - \frac{\Delta H_{pc}}{\Delta_c}\right) \times 100$$

The composition of the first aspect of the disclosure may, for example, be made and put into a mold prior to curing such that the cured resinous material has a desired shape.

The curing of the composition according to the first aspect of the disclosure may take place at a temperature equal to or greater than about 110° C. For example, the curing of the composition according to the first aspect of the disclosure may take place at a temperature equal to or greater than about 115° C., for example equal to or greater than about 120° C., for example equal to or greater than about 125° C., for example equal to or greater than about 130° C., for example equal to or greater than about 135° C., for example equal to or greater than about 140° C., for example equal to or greater than about 145° C., for example equal to or greater than about 150° C., for example equal to or greater than about 155° C., for example equal to or greater than about 160° C.

The curing of the composition according to the first aspect of the disclosure may take place at a temperature equal to or less than about 300° C. For example, the curing of the composition according to the first aspect of the disclosure may take place at a temperature equal to or less than about 295° C., for example equal to or less than about 290° C., for example equal to or less than about 285° C., for example equal to or less than about 280° C., for example equal to or less than about 275° C., for example equal to or less than about 270° C., for example equal to or less than about 265° C., for example equal to or less than about 260° C., for example equal to or less than about 255° C., for example equal to or less than about 250° C.

For example, the curing of the composition according to the first aspect of the disclosure may take place at a temperature ranging from about 110° C. to about 300° C., for example from about 120° C. to about 270° C., for example from about 140° C. to about 250° C.

The curing the composition according to the first aspect of the disclosure may take place in a number of different stages, which each occur at different temperatures and/or for different lengths of time. For example, the curing of the composition according to the first aspect of the disclosure may take place in two or three different stages, each of which occurring at a different temperature. The temperature of the curing may increase with each subsequent stage.

For example, the curing of the composition may take place in a first stage occurring at a temperature ranging from about 140° C. to about 180° C. for between about 30 minutes and about 2 hours, a second stage occurring at a temperature ranging from about 180° C. to about 200° C. for between about 2 hours and about 4 hours, and a third stage occurring at a temperature ranging from about 230° C. to about 270° C. for between about 30 minutes and about 2 hours.

The onset of polymerization (crosslinking) of the composition of the first aspect of the disclosure may, for example, be equal to or less than about 140° C. For example, the onset of polymerization of the composition of the first aspect of the disclosure may be equal to or less than about 135° C., for example equal to or less than about 130° C. The onset of polymerization of the composition of the first aspect of the disclosure may, for example, be equal to or greater than about 120° C., for example equal to or greater than about 125° C. Onset of polymerization may, for example, be measured by differential scanning calorimetry (DSC) to measure a significant deflection from the baseline, running a dynamic scan from room temperature to 400° C. at a heating rate of 10 K/min.

The curing of the composition of the first aspect of the disclosure may, for example, take place in the presence of a catalyst. The catalyst may, for example, comprise carboxylate salts and/or chelates of transition metals such as copper, zinc, manganese, cobalt or nickel, for example dissolved in a hydrogen-donating solvent such as an alkyl phenol. The curing of the composition of the first aspect of the disclosure may, for example, take place without any catalyst.

The composition of the first aspect of the disclosure may, for example, be degassed prior to curing. Degassing may occur at any temperature less than the temperature of onset of polymerisation for the particular composition. Degassing may occur at any temperature and for any period of time less than the period of time at which curing is initiated. For example, the degassing may occur at a temperature ranging from about 60° C. to about 120° C. for about 15 minutes to about 1 hour.

The cured resinous material may, for example, have a glass-transition temperature equal to or greater than about 300° C. For example, the cured resinous material may have a glass-transition temperature equal to or greater than about 310° C., for example equal to or greater than about 320° C., for example equal to or greater than about 330° C., for example equal to or greater than about 340° C., for example equal to or greater than about 350° C., for example equal to or greater than about 360° C., for example equal to or greater than about 370° C., for example equal to or greater than about 380° C. For example, the cured resinous material may have a glass-transition temperature equal to or less than about 500° C., for example equal to or less than about 490° C., for example equal to or less than about 480° C., for example equal to or less than about 470° C., for example equal to or less than about 460° C., for example equal to or less than about 450° C., for example equal to or less than about 440° C., for example equal to or less than about 430° C., for example equal to or less than about 420° C., for example equal to or less than about 410° C., for example equal to or less than about 400° C. For example, the cured resinous material may have a glass-transition temperature ranging from about 300° C. to about 500° C. or from about 350° C. to about 450° C. or from about 380° C. to about 420° C. or from about 380° C. to about 400° C.

Glass-transition temperature may, for example, be measured by Dynamic Mechanical Analysis (DMA), for example according to ASTM D4065-12 or D5279-13.

The temperature at which 5 wt/o of the mass of the cured resinous material of the second aspect of the disclosure is lost may, for example, be equal to or greater than about 400° C. For example, the temperature at which 5 wt % of the mass of the cured resinous material of the second aspect of the disclosure is lost may, for example, be equal to or greater than about 405° C., for example equal to or greater than about 410° C., for example equal to or greater than about 415° C.

The temperature at which 5 wt % of the mass of the cured resinous material of the second aspect of the disclosure is lost may, for example, be equal to or less than about 430° C., for example equal to or less than about 425° C., for example equal to or less than about 420° C.

For example, the temperature at which 5 wt % of the mass of the cured resinous material of the second aspect of the disclosure is lost may, for example, range from about 400° C. to about 430° C. or from about 410° C. to about 420° C.

The temperature at which 50 wt % of the mass of the cured resinous material of the second aspect of the disclosure is lost may, for example, be equal to or greater than about 630° C. For example, the temperature at which 50 wt/o of the mass of the cured resinous material of the second aspect of the disclosure is lost may, for example, be equal to or greater than about 635° C., for example equal to or greater than about 640° C., for example equal to or greater than about 645° C., for example equal to or greater than about 650° C.

The temperature at which 50 wt % of the mass of the cured resinous material of the second aspect of the disclosure is lost may, for example, be equal to or less than about 670° C., for example equal to or less than about 665° C., for example equal to or less than about 660° C., for example equal to or less than about 655° C.

For example, the temperature at which 50 wt % of the mass of the cured resinous material of the second aspect of the disclosure is lost may, for example, range from about 630° C. to about 670° C. or from about 640° C. to about 660° C. or from about 645° C. to about 655° C.

The mass loss at particular temperatures (thermal stability) may be determined by thermogravimetric analysis (TGA) under air or nitrogen.

The cured resinous material of the second aspect of the disclosure may, for example, have a moisture uptake after 4 hours equal to or less than about 0.35% $cm^{-3}$, for example equal to or less than about 0.32% $cm^{-3}$, for example equal to or less than about 0.30% $cm^{-3}$, for example equal to or less than about 0.28% $cm^{-3}$. The cured resinous material of the second aspect of the disclosure may, for example, have a moisture uptake after 4 hours equal to or greater than about 0.10% $cm^{-3}$, for example equal to or greater than about 0.15% $cm^{-3}$, for example equal to or greater than about 0.20% $cm^{-3}$, for example equal to or greater than about 0.25% $cm^{-3}$. For example, the cured resinous material may have a moisture uptake after 4 hours ranging from about 0.10% $cm^{-3}$ to about 0.35% $cm^{-3}$ or from about 0.20% $cm^{-3}$ to about 0.30% $cm^{-3}$.

The cured resinous material of the second aspect of the disclosure may, for example, have a moisture uptake after 25 hours equal to or less than about 0.75% $cm^{-3}$, for example equal to or less than about 0.70% $cm^{-3}$, for example equal to or less than about 0.65% $cm^{-3}$, for example equal to or less than about 0.60% $cm^{-3}$. The cured resinous material of the second aspect of the disclosure may, for example, have a moisture uptake after 25 hours equal to or greater than about 0.40% $cm^{-3}$, for example equal to or greater than about 0.45% $cm^{-3}$, for example equal to or greater than about 0.50% $cm^{-3}$. For example, the cured resinous material may have a moisture uptake after 25 hours ranging from about 0.40% $cm^{-3}$ to about 0.75% $cm^{-3}$ or from about 0.50% $cm^{-3}$ to about 0.60% cm.

The cured resinous material of the second aspect of the disclosure may, for example, have a moisture uptake after 505 hours equal to or less than about 1.70% $cm^{-3}$, for example equal to or less than about 1.65% $cm^{-3}$, for example equal to or less than about 1.60% $cm^{-3}$, for example equal to or less than about 1.55% $cm^{-3}$, for example equal to or less than about 1.50% $cm^{-3}$, for example equal to or less than about 1.45% $cm^{-3}$, for example equal to or less than about 1.40% $cm^{-3}$, for example equal to or less than about 1.35% $cm^{-3}$. The cured resinous material of the second aspect of the disclosure may, for example, have a moisture uptake after 505 hours equal to or greater than about 1.10% $cm^{-3}$, for example equal to or greater than about 1.15% $cm^{-3}$, for example equal to or greater than about 1.20% $cm^{-3}$, for example equal to or greater than about 1.25% $cm^{-3}$, for example equal to or greater than about 1.30% $cm^{-3}$. For example, the cured resinous material may have a moisture uptake after 505 hours ranging from about 1.10% $cm^{-3}$ to about 1.70% $cm^{-3}$ or from about 1.20% $cm^{-3}$ to about 1.40% $cm^{-3}$ or from about 1.25% $cm^{-3}$ to about 1.35% $cm^{-3}$.

Moisture uptake may be measured by ASTM D570-98.

Composite Material

There is also disclosed herein a composite material comprising a cured resinous material according to the second aspect of the disclosure. As used herein, a "composite material" is a material comprising two or more different materials that remain separate and distinct in the composite material, where the two or more different materials have different chemical and/or physical properties such that, when combined, produce a material that has properties different from the individual components. Thus, one component of the composite material disclosed herein is a cured resinous material as disclosed herein.

Another component of the composite material disclosed herein may, for example, be a reinforcing material as disclosed herein. The reinforcing material may, for example, be a nanomaterial.

There is also disclosed herein a method for making a composite material, the method comprising combining a composition according to the first aspect of the disclosure with a reinforcing material followed by curing the resulting composition.

The curing process may, for example, be in accordance with the curing process described herein in relation to the cured resinous material.

The composite material may, for example, have one or more of the properties such as glass transition temperature, thermal stability and/or moisture uptake described herein in relation to the cured resinous material.

Any methods known to persons skilled in the art may be used to form the composite materials disclosed herein such as hot melt pre-preg methods, filament winding methods, and resin transfer molding (RTM) methods.

Articles

There is also provided herein an article comprising the cured resinous material of the second aspect of the disclosure and an article comprising the composite material according to the third aspect of the disclosure. As used herein, an "article" refers to a commercial product or object that comprises the cured resinous material of the second aspect of the disclosure and/or the composite material according to the third aspect of the disclosure. The article may therefore be in contact with one or more other materials.

The article may, e.g. be a product or object that is one part of a larger product or object.

The article may, for example, be any article that may benefit from a material having a low moisture uptake, high flame and smoke retardancy and/or high resistance to high temperatures.

The article may, for example, be a gas turbine engine component (e.g. a gas turbine shaft such as a compressor/fan shaft, a gearbox shaft, an auxiliary drive shaft), a generator component, a motor component, a compressor variable vane, a stator vane, a rotor blade, or an airframe structure (e.g. airframe structure of a high Mach number air vehicle). The article may, for example, be a component of a gas turbine engine.

The article may, for example, be comprised within an engine. The article may, for example, be comprised within an aircraft.

EXAMPLES

Example 1—Water Uptake

Primaset® PT-30 (1) and Primaset® LECy (2) were purchased from Lonza AG (Visp, Switzerland) and were used as received. PT-30 is an oligomeric phenolic cyanate (average relative molecular mass of 381.39 gmol$^{-1}$). Bisphenol C (4, BPC) and Edge-oxidised graphene oxide (5, EOGO) were purchased from Sigma-Aldrich and Garmor Inc respectively and used as received. For clarity, each monomer is assigned a number, by which it will be referred throughout. In the case of blends, the notation [$1_x$:$2_y$] is used, where 1 and 2 are the assigned monomer numbers and x and y are their corresponding weight percentages in the blend composition.

The blends were prepared by weighing 1, 2, 4, and 5 into a 100 ml custom made reaction vessel (without the lid) in the following ratios: $1_{85}$:$2_{9.9}$:$4_5$:$5_{0.1}$ (Blend 1) and $1_{85}$:$2_{10}$:$4_5$ (Blend 2) by weight and stirred using an overhead stirrer at 90° C. for 30 minutes (until a homogeneous blend was achieved). The resulting homogeneous blend was poured into the desired mould, in which it was degassed for 30 minutes at 90° C. in a vacuum oven. Resin samples were cured in a convection oven using the following cure cycle: 160° C. for 1 hour, 200° C. for 3 hours, and 250° C. for 1 hour. Owing to its viscosity, prior to weighing the Primaset® PT-30 (1) it was heated to 90° C. for 30 minutes. To further assist the blending of the materials LECy was also melted at 90° C.

Comparative compositions were made in a similar way using one or more of PT-30, LECy and diallyl bisphenol A (DBA).

Water uptake was determined by ASTM D570-98. Cured Resins were placed in round bottomed flasks half-filled with deionised water. The temperature of the water was monitored via the use of thermocouple connected to the carousel insert of a hot plate (to allow the use of more than one round bottomed flask being heated simultaneously). After the specified time periods, the resin blocks were taken out of the water, dried using a paper towel and weighed in a mass balance with readability up to 0.0001 g.

Figure 1:
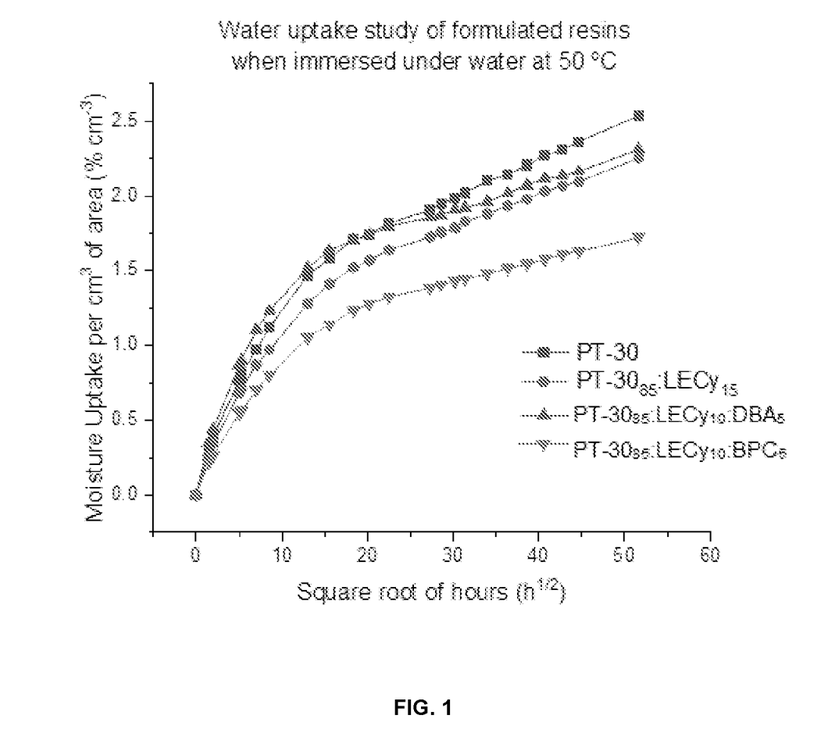
FIG. 1 shows the moisture uptake per cm³ of area (% cm⁻³) as a function of time for various resinous materials.
Figure 2:
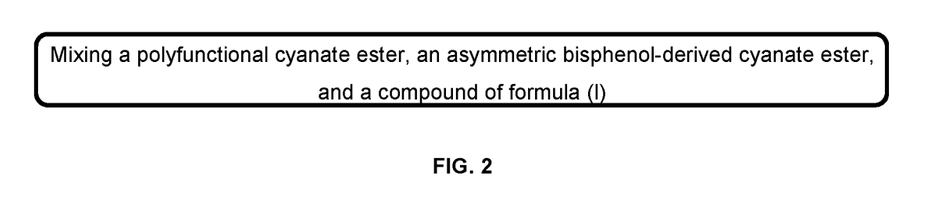
FIG. 2 illustrates a method for making a composition of the first aspect of the disclosure comprising the step of mixing a polyfunctional cyanate ester, an asymmetric bisphenol-derived cyanate ester, and a compound of formula (I).
Figure 3:
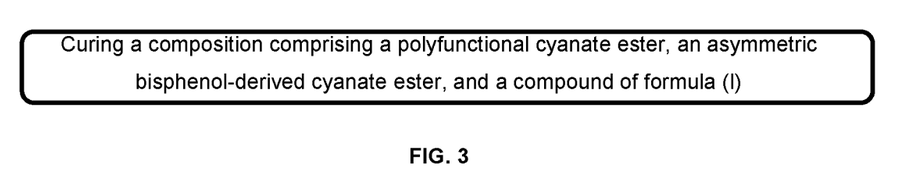
FIG. 3 illustrates schematically a method for making a cured resinous material of the second aspect of the disclosure comprising the step of curing a composition comprising a polyfunctional cyanate ester, an asymmetric bisphenol-derived cyanate ester, and a compound of formula (I).
Figure 4:
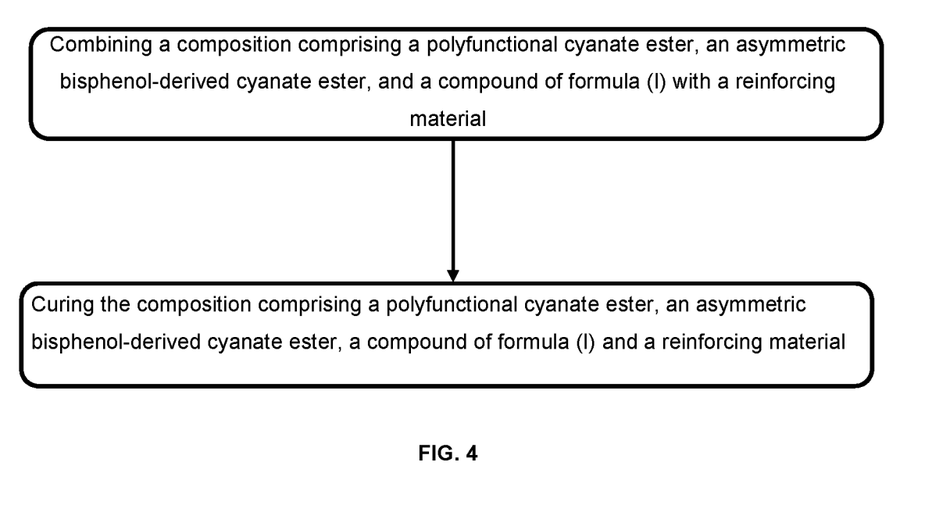
FIG. 4 illustrates schematically a method for making a composite material of the third aspect of the disclosure comprising a step of combining a composition comprising a polyfunctional cyanate ester, an asymmetric bisphenol-derived cyanate ester, and a compound of formula (I) with a reinforcing material, followed by a step of curing the resulting composition comprising a polyfunctional cyanate ester, an asymmetric bisphenol-derived cyanate ester, and a compound of formula (I) and a reinforcing material.

The results are shown in FIG. 1 and Table 1 below.

TABLE 1

| Hours | Square root of hours | PT-30 (% cm$^{-3}$) | PT-30$_{85}$:LECy$_{10}$:BPC$_5$ (% cm$^{-3}$) |
|---|---|---|---|
| 0 | 0.00 | 0.00 | 0.00 |
| 2 | 1.41 | 0.31 | 0.22 |
| 4 | 2.00 | 0.39 | 0.26 |
| 25 | 5.00 | 0.76 | 0.55 |
| 28 | 5.29 | 0.80 | 0.56 |
| 49 | 7.00 | 0.97 | 0.70 |
| 73 | 8.54 | 1.12 | 0.80 |
| 169 | 13.00 | 1.46 | 1.05 |
| 241 | 15.52 | 1.58 | 1.14 |
| 337 | 18.36 | 1.71 | 1.23 |
| 409 | 20.22 | 1.74 | 1.28 |
| 505 | 22.47 | 1.82 | 1.32 |
| 745 | 27.29 | 1.90 | 1.39 |
| 817 | 28.58 | 1.95 | 1.41 |
| 913 | 30.22 | 1.99 | 1.43 |
| 985 | 31.38 | 2.02 | 1.45 |
| 1153 | 33.96 | 2.10 | 1.48 |

TABLE 1-continued

| Hours | Square root of hours | PT-30 (% cm$^{-3}$) | PT-30$_{85}$:LECy$_{10}$:BPC$_5$ (% cm$^{-3}$) |
|---|---|---|---|
| 1321 | 36.35 | 2.14 | 1.51 |
| 1489 | 38.59 | 2.21 | 1.54 |
| 1657 | 40.71 | 2.27 | 1.57 |
| 1825 | 42.72 | 2.31 | 1.61 |
| 1993 | 44.64 | 2.36 | 1.63 |
| 2665 | 51.62 | 2.54 | 1.72 |
| 3337 | 57.77 | 2.69 | 1.80 |
| 4177 | 64.63 | 2.88 | 1.89 |

Example 2—Dynamic Rheology of Resin Blends

A number of resin blends were made as described in Example 1 above (but without curing).

Dynamic rheology of the resin blends was measured by ASTM D4440-15.

The results are shown in Table 2 below.

TABLE 2

| Resin Blend | Complex viscosity (Pa · s) at 30° C. |
|---|---|
| PT-30 | 296 |
| PT-30$_{95}$LECy$_0$BPC$_5$ | 926 |
| PT-30$_{90}$ LECy$_5$ BPC$_5$ | 383 |
| PT-30$_{85}$ LECy$_{10}$ BPC$_5$ | 203 |
| PT-30$_{80}$ LECy$_{15}$ BPC$_5$ | 101 |
| PT-30$_{75}$ LECy$_{20}$ BPC$_5$ | 47 |
| PT-30$_{70}$ LECy$_{25}$ BPC$_5$ | 28 |

Example 3—Onset of Polymerisation and Degree of Curing

A number of resin blends were prepared as described above in Example 1 (but without curing).

Degree of curing was measured by differential scanning calorimetry (DSC), running a dynamic scan from room temperature to 400° C. at a heating rate of 10K/min. Degree of curing is calculated using the following formula in which $\Delta H_c$ is the curing exotherm enthalpy (J/g) and $\Delta H_{pc}$ is the post-curing exotherm enthalpy (J/g).

$$\left(1 - \frac{\Delta H_{pc}}{\Delta_c}\right) \times 100$$

Onset of polymerization was measured by differential scanning calorimetry (DSC) to measure a significant deflection from the baseline, running a dynamic scan from room temperature to 400° C. at a heating rate of 10 K/min.

The results are shown in Table 3 below.

TABLE 3

| System | Temperature of onset of polymerisation (° C.) | Curing exotherm enthalpy ($\Delta H_c$) (J/g)) | Post-curing exotherm enthalpy ($\Delta H_{pc}$) (J/g)) | Curing conversion ($\alpha$) $\left(1 - \frac{\Delta H_{pc}}{\Delta_c}\right)$ |
|---|---|---|---|---|
| PT-30 | 188 | 581.3 | 24.1 | 0.959 |
| PT-30$_{95}$LECy$_0$BPC$_5$ | 125 | 679.8 | 54.2 | 0.920 |
| PT-30$_{90}$LECy$_5$BPC$_5$ | 130 | 718.6 | 59.1 | 0.918 |
| PT-30$_{85}$LECy$_{10}$BPC$_5$ | 134 | 748.3 | 57.7 | 0.923 |

TABLE 3-continued

| System | Temperature of onset of polymerisation (° C.) | Curing exotherm enthalpy ($\Delta H_c$) (J/g) | Post-curing exotherm enthalpy ($\Delta H_{pc}$) (J/g) | Curing conversion ($\alpha$) $\left(1 - \frac{\Delta H_{pc}}{\Delta_c}\right)$ |
|---|---|---|---|---|
| PT-30$_{80}$LECy$_{15}$BPC$_5$ | 130 | 760.8 | 75.9 | 0.900 |
| PT-30$_{75}$LECy$_{20}$BPC$_5$ | 130 | 814.1 | 76.7 | 0.906 |
| PT-30$_{70}$LECy$_{25}$BPC$_5$ | 127 | 816.8 | 68.6 | 0.916 |

Example 4—Thermal Stability

A number of resin blends were prepared as described above in Example 1 (but without curing).

Thermal stability was determined by thermogravimetric analysis (TGA) under air or nitrogen.

The results are shown in Tables 4 and 5 below.

TABLE 4

| Air | Mass Loss by wt % | | | | | |
|---|---|---|---|---|---|---|
|  | 5% (° C.) | 10% (° C.) | 20% (° C.) | 30% (° C.) | 40% (° C.) | 50% (° C.) |
| PT-30$_{95}$LECy$_0$BPC$_5$ | 420.82 | 434.71 | 497.88 | 600.13 | 636.21 | 664.59 |
| PT-30$_{90}$LECy$_5$BPC$_5$ | 417.31 | 430.45 | 489.25 | 594.03 | 628.88 | 655.40 |
| PT-30$_{85}$LECy$_{10}$BPC$_5$ | 418.25 | 431.05 | 487.19 | 593.23 | 628.56 | 651.37 |
| PT-30$_{80}$LECy$_{15}$BPC$_5$ | 419.00 | 430.87 | 482.57 | 591.01 | 628.72 | 652.14 |
| PT-30$_{75}$LECy$_{20}$BPC$_5$ | 416.91 | 428.74 | 477.06 | 585.79 | 622.40 | 643.12 |
| PT-30$_{70}$LECy$_{25}$BPC$_5$ | 418.30 | 428.97 | 461.46 | 572.37 | 618.16 | 640.30 |

TABLE 5

| Nitrogen | Mass Loss by wt % | | | | Char Yield at 800° C. |
|---|---|---|---|---|---|
|  | 5% (° C.) | 10% (° C.) | 20% (° C.) | 30% (° C.) |  |
| PT-30 | 433.14 | 446.79 | 529.82 | 696.37 | 67.75 |
| PT-30$_{95}$LECy$_0$BPC$_5$ | 425.03 | 437.87 | 505.21 | 656.59 | 65.57 |
| PT-30$_{90}$LECy$_5$BPC$_5$ | 423.53 | 435.79 | 490.49 | 629.73 | 64.19 |
| PT-30$_{85}$LECy$_{10}$BPC$_5$ | 423.51 | 434.58 | 479.70 | 609.39 | 62.57 |
| PT-30$_{80}$LECy$_{15}$BPC$_5$ | 426.88 | 437.51 | 478.50 | 604.09 | 62.51 |
| PT-30$_{75}$LECy$_{20}$BPC$_5$ | 421.59 | 431.73 | 468.90 | 589.28 | 61.86 |
| PT-30$_{70}$LECy$_{25}$BPC$_5$ | 422.07 | 431.44 | 458.54 | 568.51 | 60.15 |

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A composition comprising:

(a) from about 80 to 90% by weight of an oligomer of formula (II):

(II)

wherein n is 1 to 3;

(b) about 10% by weight of a compound of the following formula:

and (c) about 5% by weight of a compound of the following formula:

2. The composition of claim 1, wherein the composition further comprises a nanomaterial.

3. The composition of claim 2, wherein the nanomaterial is edge-oxidised graphene oxide.

4. The composition of claim 3, wherein the nanomaterial is present in the composition in an amount equal to or less than about 5.0 wt % and/or equal to or greater than about 0.01 wt %, based on the total dry weight of the composition.

5. The composition of claim 1, wherein a resinous material obtained by curing the composition has a moisture uptake determined by ASTM D570-98 after 4 hours ranging from about 0.10% $cm^{-3}$ to about 0.35% $cm^{-36}$.

6. The composition of claim 1, wherein a resinous material obtained by curing the composition has a moisture uptake determined by ASTM D570-98 after 25 hours ranging from about 0.40% $cm^{-3}$ to about 0.75% $cm^{-36}$.

7. The composition of claim 1, wherein a resinous material obtained by curing the composition has a moisture uptake determined by ASTM D570-98 after 505 hours ranging from about 1.10% $cm^{-3}$ to about 1.70% $cm^{-36}$.

8. An article comprising a cured composition of claim 1.

9. The article of claim 8, wherein the article is a gas turbine engine component.

10. A method of making a composition according to claim 1, the method comprising mixing (a), (b) and (c).

11. A cured resinous material obtainable by curing the composition of claim 1.

12. The cured resinous material of claim 11, having a glass-transition temperature equal to or greater than about 300° C.

* * * * *